United States Patent
Gong

[11] Patent Number: 5,998,972
[45] Date of Patent: Dec. 7, 1999

[54] METHOD AND APPARATUS FOR RAPIDLY CHARGING A BATTERY OF A PORTABLE COMPUTING DEVICE

[75] Inventor: Andrew Gong, San Mateo, Calif.

[73] Assignee: Apple Computer, Inc., Cupertino, Calif.

[21] Appl. No.: 09/070,495

[22] Filed: Apr. 30, 1998

[51] Int. Cl.$^6$ .................................................. H02J 7/00
[52] U.S. Cl. ........................................... 320/134; 320/164
[58] Field of Search ...................... 320/136, 135, 320/134, DIG. 21, 132, 128, 162, 163, 164

[56] References Cited

U.S. PATENT DOCUMENTS

| | | |
|---|---|---|
| 5,596,260 | 1/1997 | Moravec et al. . |
| 5,622,789 | 4/1997 | Young . |
| 5,644,212 | 7/1997 | Takahashi ................................ 320/134 |
| 5,645,949 | 7/1997 | Young . |
| 5,666,006 | 9/1997 | Townsley et al. . |
| 5,739,667 | 4/1998 | Matsuda ................................... 320/164 |
| 5,773,963 | 6/1998 | Blanc et al. . |

*Primary Examiner*—Peter S. Wong
*Assistant Examiner*—K. Shin
*Attorney, Agent, or Firm*—Beyer & Weaver, LLP

[57] ABSTRACT

Improved techniques for charging batteries within portable computing devices are disclosed. The improved techniques operates to charge a battery at an approximately constant power level by adjusting a charge current as the battery voltage changes. As a result, the battery is able to be charged at a rate that is significantly faster than previously performed. Also, by monitoring the amount of power that is available for charging, the improved techniques ensure that the portable computing device is not starved for power during its operation.

28 Claims, 10 Drawing Sheets

METHOD AND APPARATUS FOR RAPIDLY CHARGING A BATTERY OF A PORTABLE COMPUTING DEVICE

CROSS REFERENCE TO RELATED APPLICATION

This application is related to U.S. application Ser. No. 09/070,489 (Att. Dkt. No. APL1 P182/P2215), entitled "METHOD AND APPARATUS FOR RAPIDLY CHARGING A COMPUTER'S BATTERY USING DYNAMICALLY DETERMINED POWER LEVELS", filed on even date herewith, and hereby incorporated by reference.

BACKGROUND OF THE INVENTION

1. Field of the Invention

The present invention relates to portable computing devices and, more particularly, to charging batteries of portable computing devices.

2. Description of the Related Art

A computing device often includes one or more batteries to supply power to the computing device. Those computing device that can use batteries to supply power to operate the computing device are referred to as portable computing devices. Portable computing devices pertain to a wide range of devices, including portable computers (various sizes), wireless phones, etc.

Normally, these portable computing devices use rechargeable batteries as the primary source of power to the device. The portable computing device typically are also able to couple to an alternating current (AC power source with an AC adapter. The AC adapter plugs into a electric wall socket and converts incoming AC power into DC power which is used to power the portable computing device and/or charge the rechargeable batteries within the portable computing device.

Conventionally, these batteries take a considerable amount of time to fully charge. One reason why the conventional charging is so slow is that the amount of power varies over the charging cycle as the battery voltage changes but the charging current remain fixed at a safe level. With this approach, the fixed current level is set to a rather low level so that when the portable computing device is active it will not be starved for power by the charging of the battery. If the portable computing device were to be starved for power during its operation, then the portable computing device would fail, crash or otherwise cease to operate.

Thus, there is a need for charging techniques that are able to better utilize available power to charge batteries.

SUMMARY OF THE INVENTION

Broadly speaking, the invention relates to improved techniques for charging batteries within portable computing devices. The invention operates to charge a battery at an approximately constant power level by adjusting a charge current as the battery voltage changes. As a result, the battery is able to be charged at a rate that is significantly faster than previously performed. Also, by monitoring the amount of power that is available for charging, the invention ensures that the portable computing device is not starved for power during its operation.

The invention can be implemented in numerous ways, including as a method, an apparatus, and a computer system. Several embodiments of the invention are discussed below.

As a method for charging a battery of a portable computing device from a power supply, an embodiment of the invention includes the operations of: determining an amount of power available for charging from the power supply; determining power limits for charging the battery from the battery; setting a power charge level for charging the battery based on the power limits and the available power; and charging the battery in accordance with the power charge level. Preferably, the embodiment can also repeat the operations so that the power charge level can be periodically adjusted in accordance with the power limits and the available power.

As a method for charging a battery within a portable computing device using a charge current, an embodiment of the invention includes the operations of: coupling the portable computing device to a power source; obtaining a maximum charge current and a maximum charge voltage from the battery; determining an amount of power from the power source that is available for charging the battery; determining an efficient charge current based on the battery voltage and the amount of power available; and producing a charge current based on the lesser of the maximum charge current and the efficient charge current, the charge current being used to charge the battery.

As a computer system, an embodiment of the invention includes: a power supply for providing DC power to the computer system from an AC power source; a battery for providing DC power to the computer system; a processing and storage apparatus for performing computations as well as storage and retrieval of data; a power management unit for monitoring status of the battery and determining a power charge level for charging the battery based on an amount of available power from the power supply after supplying power to the processing apparatus; and a battery charge circuit for delivering power from the power supply to the battery in accordance with the power charge level.

The advantages of the invention are numerous. One advantage of the invention is that a battery are able to be charged significantly faster than previously. Another advantage of the invention is that the charging of the battery is safely performed regardless of the amount of power being consumed by the operation of the portable computing device.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved techniques for charging batteries within portable computing devices. The invention operates to charge a battery at an approximately constant power level by adjusting a charge current as the battery voltage changes. As a result, the battery is able to be charged at a rate that is significantly faster than previously performed. Also, by monitoring the amount of power that is available for charging, the invention ensures that the portable computing device is not starved for power during its operation.

Embodiments of the invention are discussed below with reference to FIGS. 1–10. However, those skilled in the art will readily appreciate that the detailed description given herein with respect to these figures is for explanatory purposes as the invention extends beyond these limited embodiments.

Figure 1:
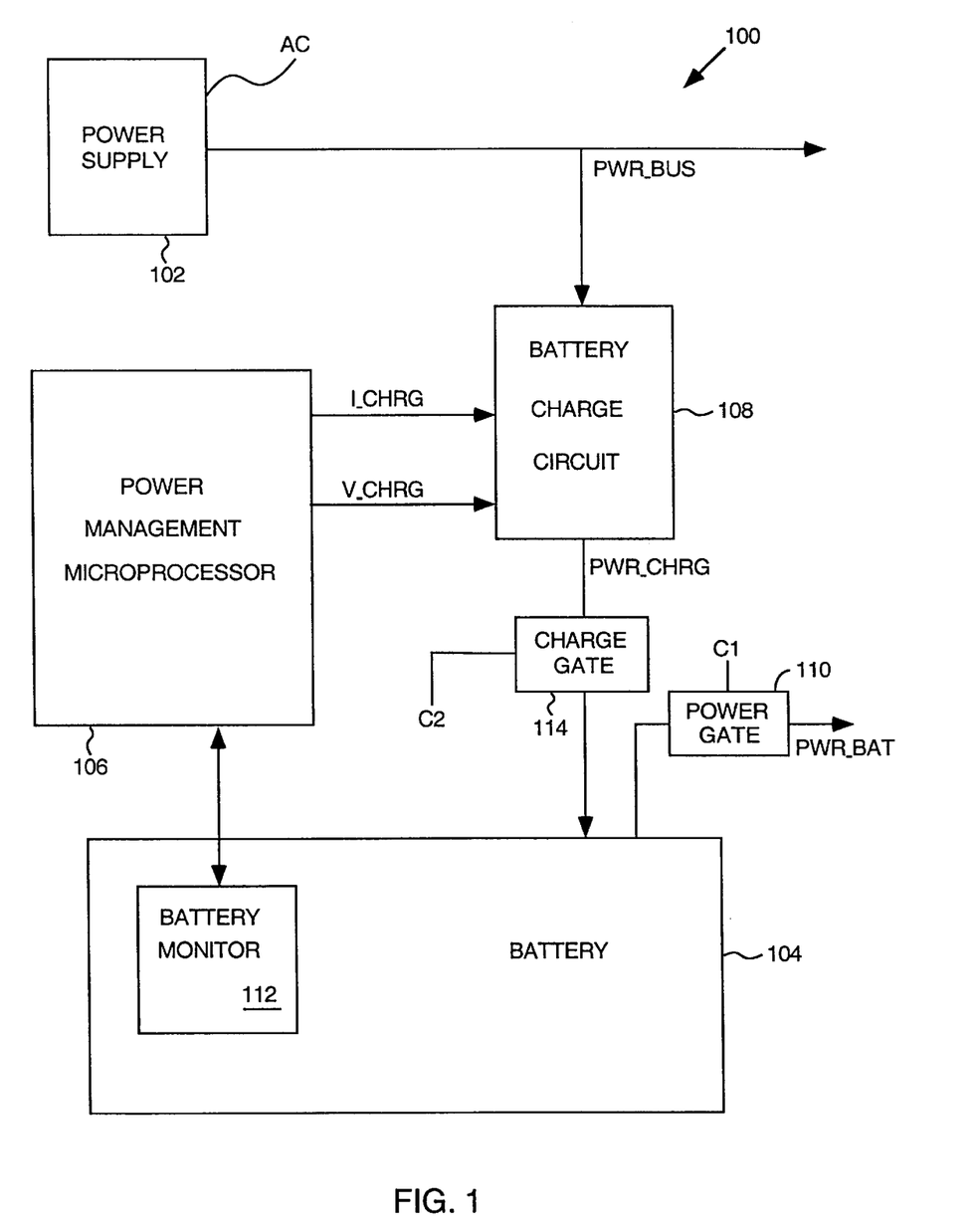
FIG. 1 is a block diagram of a portion of a portable computing device according to an embodiment of the invention.

FIG. 1 is a block diagram of a portion 100 of a portable computing device according to an embodiment of the invention. The portion 100 of the portable computing device is concerned with the supply of power to the portable computing device either through a power supply unit or a battery.

In particular, the portion 100 of the portable computing device includes a power supply 102 and a battery 104. The power supply 102 connects to an alternating current (AC) source that serves as a source of power. The battery 104 serves as an alternative source of power. As is common in a portable computing device, the portable computing device can be supplied with power from either the power supply 102 or the battery 104. In other words, if the power supply 102 is able to be coupled to the AC source, then the power supply 102 can supply power to the portable computing device, namely a data processing and storage apparatus associated with the portable computing device. On the other hand, when the power supply 102 is not able to be connected to the AC source, then the battery 104, if charged, can supply power to the portable computing device.

The portion 100 of the portable computing device also includes a power management microprocessor 106 that manages the power consumption of the portable computing device. For example, the power management microprocessor 106 can perform various power saving features utilized with existing portable computing devices. Examples of such power saving features include: directing the system to a low-power state, dimming a display screen, or removing power from various subsystems of the portable computing device.

Additionally, according to the invention, the power management microprocessor 106 is used to control charging of the battery 104. Specifically, the power management microprocessor 106 couples to a battery charged circuit 108 in order to control the charging of the battery 104 of the portable computing device. The battery 104 is coupled to the processing apparatus by a power gate 110. The power gate 110 is controlled by a control signal (C1) and supplies power to the processing and storage apparatus via a battery power bus (PWR_BAT) when the power gate 110 is closed. Otherwise, when the power gate 110 is open, the battery 104 is not able to supply power to the processing and storage apparatus. The control signal (C1) can be provided by a variety of sources, for example, the power management microprocessor 106.

In one implementation, the battery 104 is a "smart battery" that is able to monitor its own condition. More particularly, the battery 104 includes a battery monitor 112 that monitors the condition of the battery 104 and supplies digital signals to other components of the computer system that are interested in monitoring the conditions of the battery 104. In the embodiment illustrated in FIG. 1, the battery monitor 112 forwards a charge request and status information to the power management microprocessor 106. The charge request, for example, includes a maximum charge current and a maximum charge voltage that the battery 104 desires to receive for the purpose of charging the battery 104. Typically, these maximum values are associated with the chemical composition of the battery 104 and thus can vary from battery to battery. The status information, for example, includes battery voltage, battery temperature, and capacity (e.g., percentage charged or discharged). In any event, the power management microprocessor 106 receives the charge request and the status information from the battery monitor 112, and then processes the information to determine a suitable charge current (I_CHRG) and a charge voltage (V_CHRG).

The battery charge circuit 108 is coupled to a power bus (PWR_BUS) and a power charge bus (PWR_CHRG). The power charge bus (PWR_CHRG) carries the power to the battery 104 in order to charge the battery 104. The power charge bus (PWR_CHRG) is coupled to the battery 104 through a charge gate 114. The charge gate 114 is controlled by a control signal (C2). When the charge gate 114 is closed, the power charge bus (PWR_CHRG) is coupled to the battery 104 and thus the battery 104 is able to be charged. On the other hand, when the charge gate 114 is open, the power charge bus (PWR_CHRG) is isolated from the battery 104 and thus does not charge the battery 104. The control signal (C2) can be provided by a variety of sources, for example, the power management microprocessor 106.

The battery charge circuit 108 determines an appropriate amount of power to supply to the battery 104 over the power charge bus (PWR_CHRG). The battery charge circuit 108 regulates the appropriate amount of power supplied to the battery 104 using the charge current (I_CHRG) and the charge voltage (V_CHRG). In one implementation, the appropriate amount of power to supply to the battery 104 is controlled by controlling the charge current (I_CHRG) such that the product of the charge current (I_CHRG) and the voltage of the battery (part of the status information from the battery monitor 112) remains nearly constant during the charging operation. Accordingly, during charging, as the voltage of the battery increases, the charge current (I_CHRG) is reduced so as to continue to supply an approximately constant amount of power to the battery.

Figure 2:
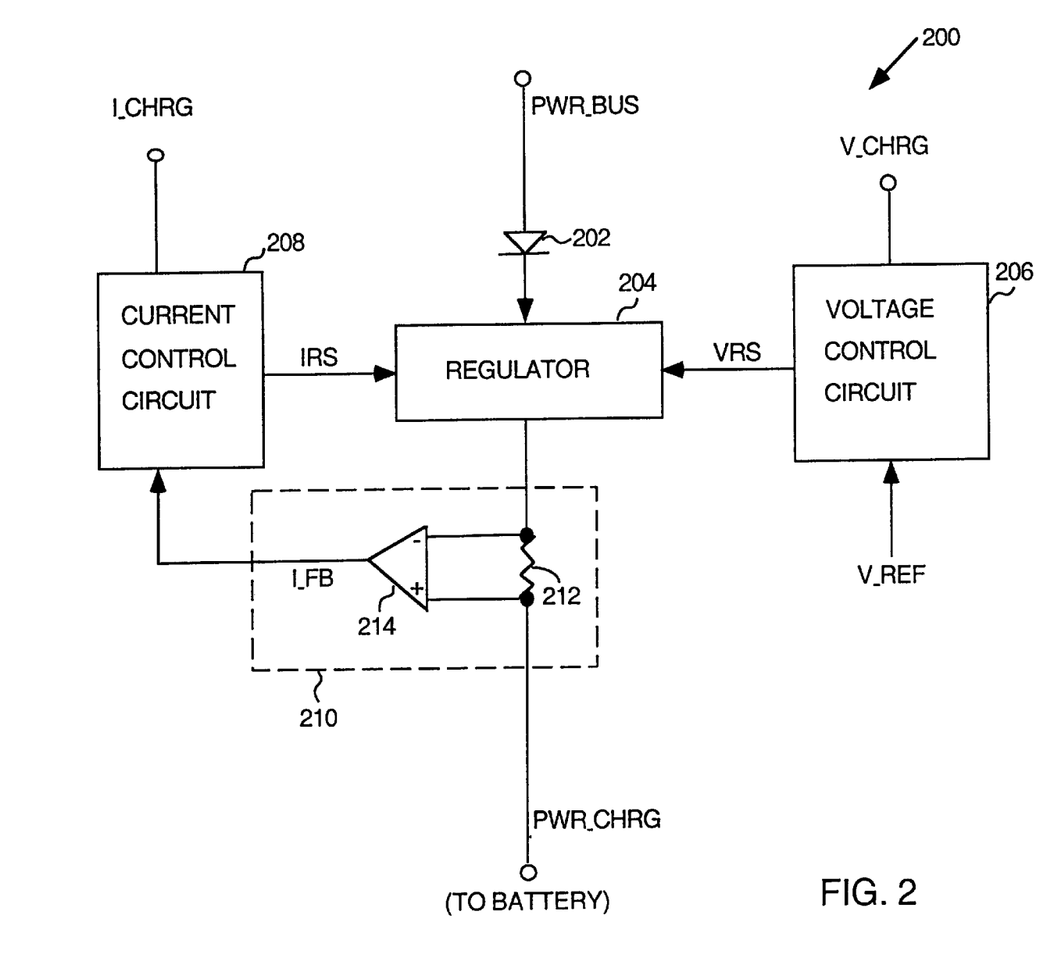
FIG. 2 is a schematic diagram of a battery charge circuit according to an embodiment of the invention.

FIG. 2 is a schematic diagram of a battery charge circuit 200 according to an embodiment of the invention. The battery charge circuit 200 is, for example, suitable for use as the battery charge circuit 108.

The battery charge circuit 200 includes a diode 202, a regulator 204, a voltage control circuit 206, a current control circuit 208, and a feedback circuit 210. The diode 202 serves to couple the power bus (PWR_BUS) to the regulator 204 so as to supply power from the power bus (PWR_BUS) to the regulator 204. The regulator 204 limits the amount of power that is drawn from the power bus (PWR_BUS) such that excessive amounts of power are not drawn from the power supply 102 that would cause the system to fail or otherwise crash. The voltage control circuit 206 and the current control circuit 208 operate to assist the regulator 204 in controlling the power that is drawn from the power supply and supplied to the power charge bus (PWR_CHRG).

In the case where the battery charge circuit is used as the battery charge circuit 108, the voltage control circuit 206 and the current control circuit 208 are controlled by the power management microprocessor 106. The voltage control circuit 206 receives the charge voltage signal (V_CHRG) from the power management microprocessor 106 as well as a voltage reference signal (V_REF). Using these signals, the voltage control circuit 206 sends a voltage regulation signal (VRS) to the regulator 204. The voltage regulation signal (VRS) signals the regulator 204 in a manner such that the regulator 204 understands the difference between the charge voltage (V_CHRG) and the reference voltage (V_REF).

The current control circuit 208 receives a current charge signal (I_CHRG) from the power management microprocessor 106 and receives a feedback signal (I_FB) from the feedback circuit 210. The current control circuit 208 uses the charge current signal ($I_{CHRG}$) and the feedback signal (I_FB) to supply a current regulation signal (IRS) to the regulator 204. The current regulation signal (IRS) informs the regulator 204 of the difference between the charge current (I_CHRG) and the feedback signal (I_FB).

In one embodiment, the feedback circuit 210 includes a resistor 212 and a differential amplifier 214. The resistor 212 is placed in series between the regulator 204 and the power charge bus (PWR_CHRG). The two input terminals of the differential amplifier 214 are coupled to opposite sides of the resistor 212. Then, the voltage drop across the resistor 212 is input to the differential amplifier 214 to produce the feedback signal (I_FB). The feedback signal (I_FB) serves as some indication of the current (i.e., charge current) flowing from the regulator 204 to the power charge bus (PWR_CHRG) and then to the battery 104.

Figure 3:
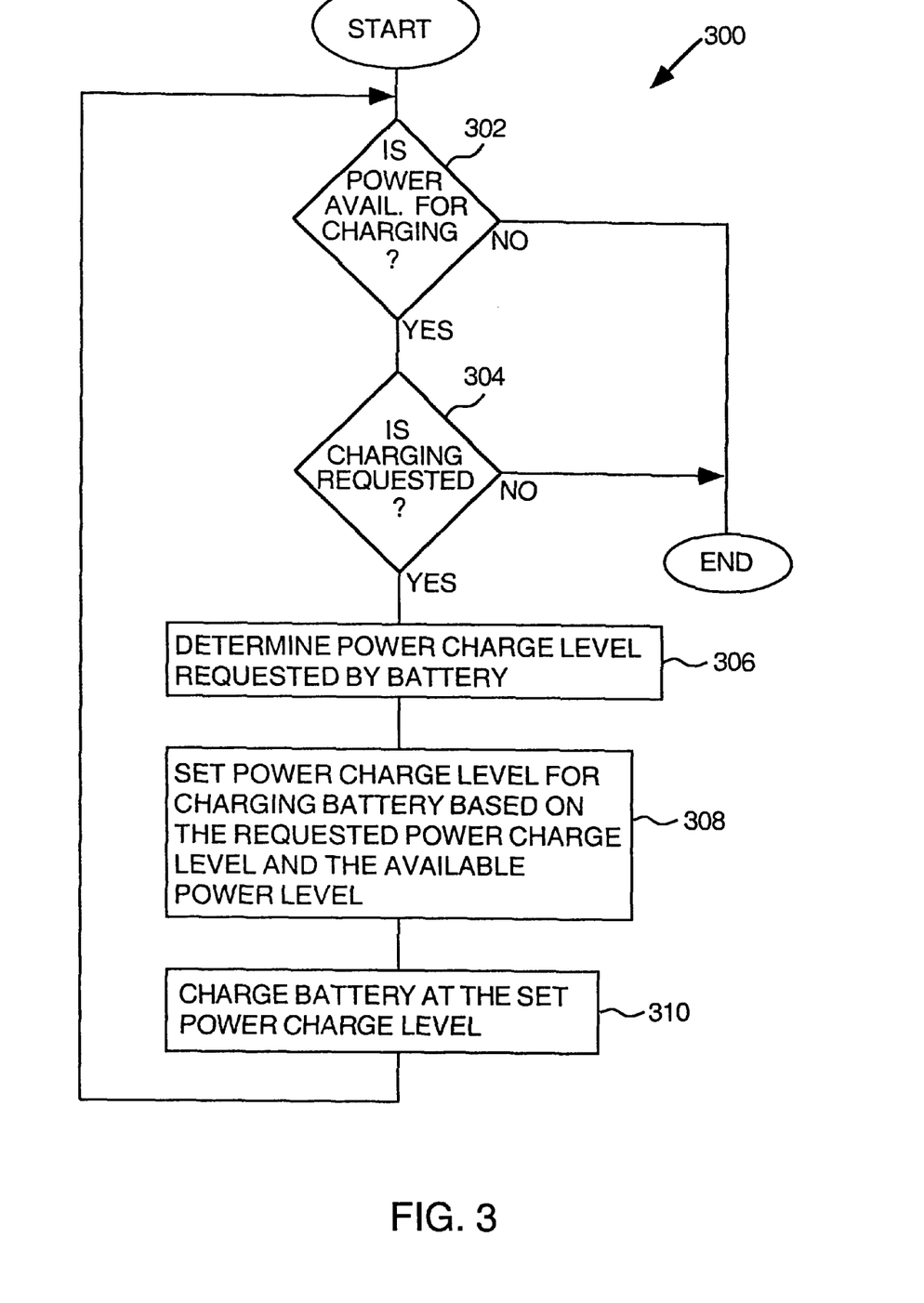
FIG. 3 is a flow diagram of battery charge processing according to an embodiment of the invention.

FIG. 3 is a flow diagram of battery charge processing 300 according to an embodiment of the invention. The battery charge processing 300 is used to charge a battery associated with a portable computing device. The battery charge processing 300 is, for example, performed by the portion 100 of the portable computing device illustrated in FIG. 1, namely, the power management microprocessor 106 and the battery charge circuit 108.

The battery charge processing 300 initially begins with a decision block 302. The decision block 302 determines whether there is power available for charging a battery. In other words, the decision block 302 determines whether a power supply that is responsible for generally supplying power to the portable computing device has a sufficient amount of power not only for charging purposes but also for supplying power to the various active components of the portable computing device. As an example, a major component if the portable computing device is a processing and storage apparatus. In general, other components of the portable computing device include, for example, display screen, storage drive, modem, and the like. When the decision block 302 determines that there is no power available for charging, then the battery charge processing 300 is complete and ends.

On the other hand, when the decision block 302 determines that there is power available for charging, a decision block 304 determines whether charging is requested. The decision block 304, for example, determines whether charging is requested by the battery 104. In this example, the battery 104 is a "smart battery" that can itself request charging or otherwise indicate that charging is needed. Thus, when the decision block 304 determines that charging is not requested, the battery charge processing 300 is complete and ends.

Alternatively, when the decision block 304 determines that charging is requested, then the battery charge processing 300 continues. Namely, a power charge level being requested by the battery is determined 306. Next, a power charge level for charging the battery is set 308 based on the requested power charge level and the available power level. Thereafter, the battery is charged 310 at the set power charge level. Following block 310, the battery charge processing 300 returns to repeat the decision block 302 and subsequent blocks so that the power charge processing 300 is able to periodically update the power charge level by which it is charging the battery. For example, the power charge level for charging the battery can be increased or decreased periodically due to changes in the battery conditions, etc.

Figure 4:
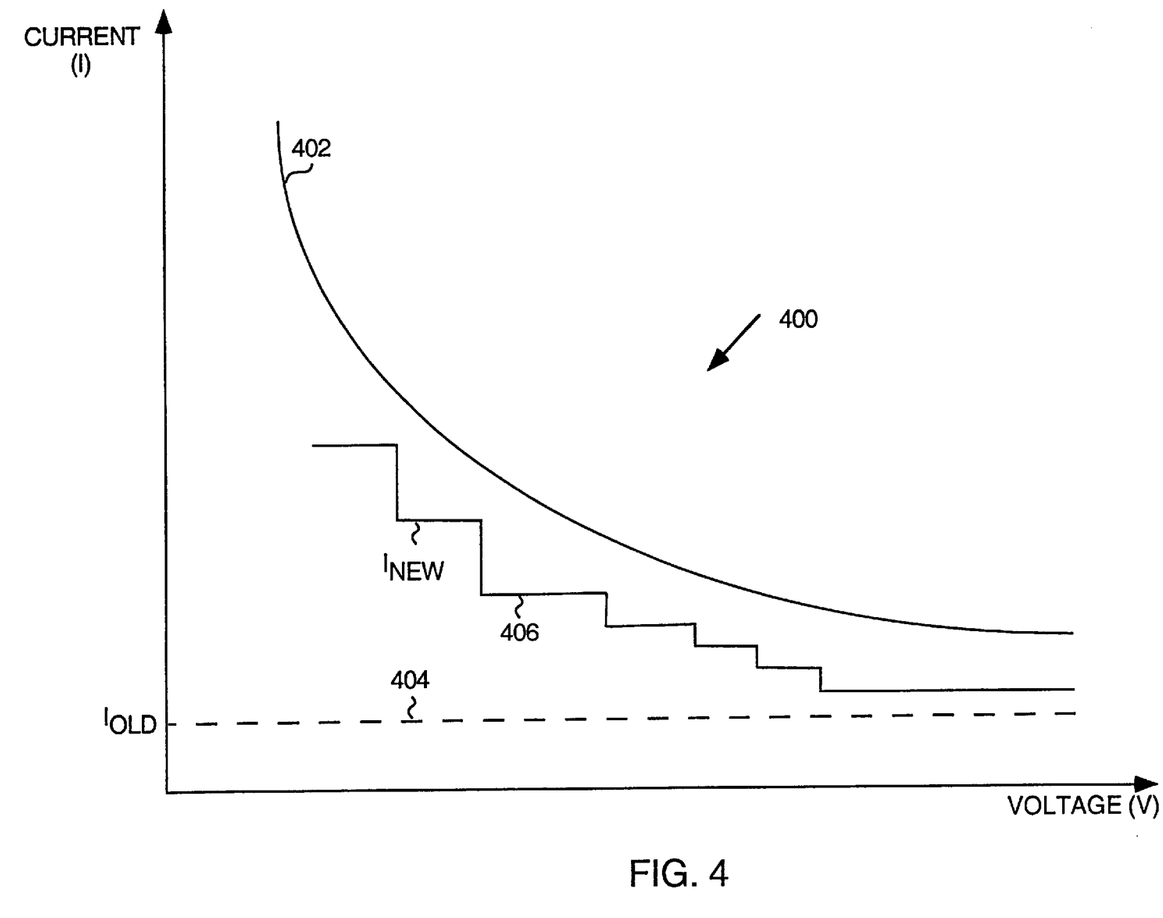
FIG. 4 is a graph illustrating the improved power level charging provided by the invention.

FIG. 4 is a graph 400 illustrating the improved power level charging provided by the invention. The graph 400 has current (I) plotted on the vertical axis and has voltage (V) plotted on the horizontal axis. The current and voltage are those use to charge a battery. A curve 402 illustrated in FIG. 4 represents an ideal power curve that is presumed to represent the power available for charging the battery, as the voltage increases the current decreases. Conventionally, the charging of a battery was typically achieved using a constant current over the entire voltage range of the battery. FIG. 4 illustrates a representative conventional current ($I_{OLD}$) by the line 404. In contrast, the invention uses a staircase-type line 406 as a representative charge current ($I_{NEW}$) utilized by the invention. Notice that the representative charge current ($I_{NEW}$) varies its magnitude over the voltage range of the battery. The staircase-type line 406 is implemented such that the amount of current used to charge the battery differs depending upon the voltage level such that the power utilized to charge the battery nearly approximates the ideal power curve 402. Accordingly, FIG. 4 illustrates one advantage of the invention, namely, that substantially more power is able to be supplied to the battery than was previously conventionally achieved. Consequently, the battery is able to be safely charged substantially faster than conventionally possible. The ability to charge a battery faster is important because often a portable computing device is only coupled to an AC source of power for short periods of time and other wise rely on charged batteries to provide the necessary power.

Figure 5:
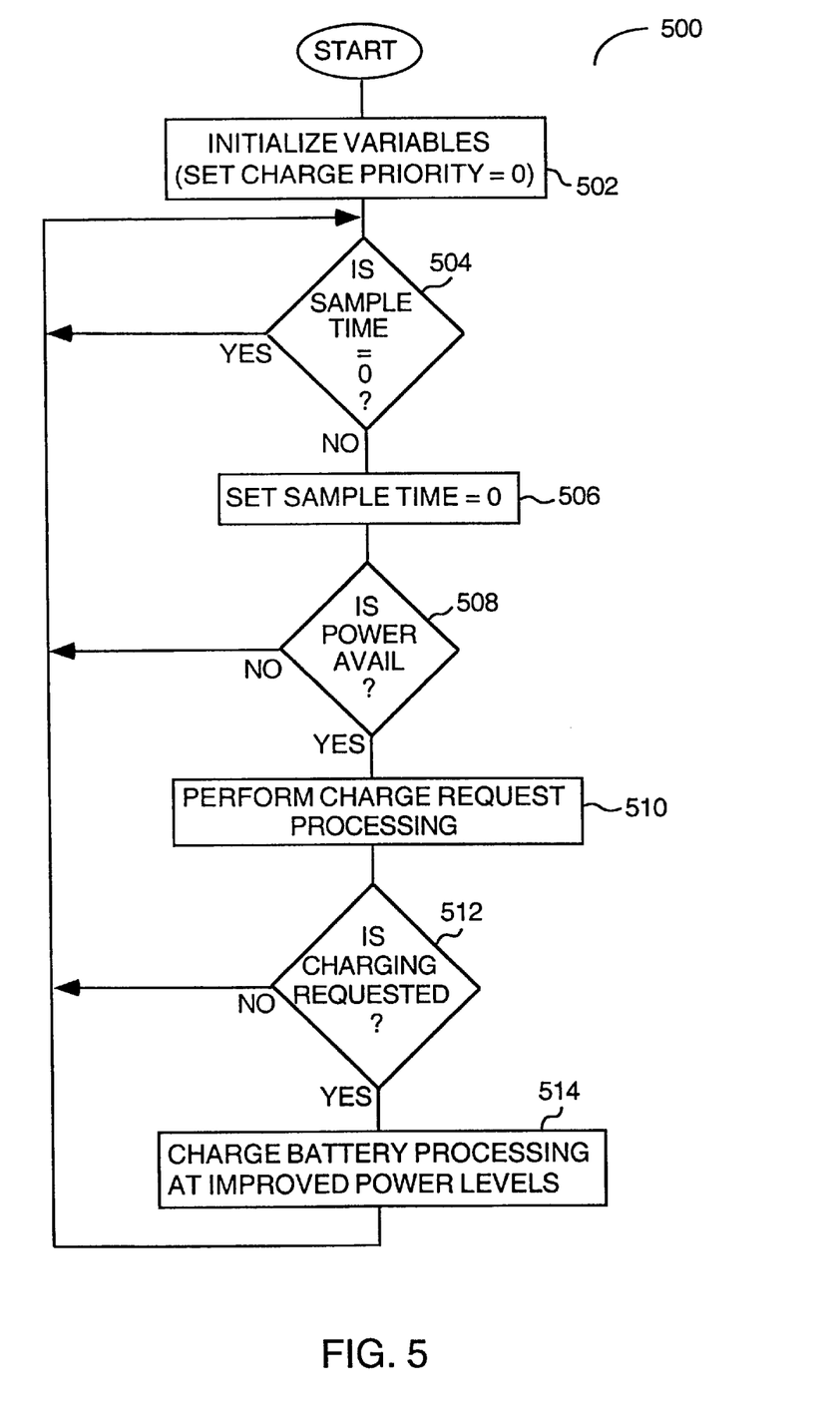
FIG. 5 is a flow diagram of battery charge processing according to another embodiment of the invention.

FIG. 5 is a flow diagram of battery charge processing 500 according to another embodiment of the invention. The battery charge processing 500 is used to charge a battery associated with a portable computing device. The battery charge processing 500 is, for example, performed by the portion 100 of the portable computing device illustrated in FIG. 1, namely, the power management microprocessor 106 and the battery charge circuit 108.

The battery charge processing 500 starts by initializing 502 variables. For example, a charge priority for the charge processing of a particular battery is set to zero (0). Should the portable computing device have a plurality of batteries, then the charge priorities can be used to select and then charge one of the batteries at a time.

Next, a decision block 504 determines whether the sample time equals zero (0). Here, the decision block 504 determines whether a predetermined time delay has elapsed since the battery charge processing 500 was previously executed. If the predetermined period of time has not yet passed, the decision block 504 causes the battery charge processing 500 to wait until it has elapsed. Once the sample time has elapsed since the last time the battery charge processing 500 was fully executed, the decision block 504 causes the battery charge processing 500 to continue.

When the battery charge processing 500 continues, the sample time is set 506 to zero (0). This resets the sample time flag to zero (0) which is set to one (1) after the predetermined period of time has elapsed by another mechanism. Next, a decision block 508 determines whether there is power available for charging the battery. When the decision block 508 determines that there is no power available for charging the battery, then the battery charge processing 500 returns to repeat the decision block 504 and subsequent blocks because charging would in such a case not be permitted until there is power available for charging the battery. On the other hand, when the decision block 508 determines that there is power available for charging, then charge request processing is performed 510. The charge request processing is described in detail below with respect to FIG. 6.

After the charge request processing is performed 510, a decision block 512 determines if charging is requested. Here, normally the battery itself is intelligent enough to signal its request that charging is desired. Alternatively, other circuitry is able to monitor the battery to determine when charging is needed. When the decision block 512 determines that charging is not requested, then the battery charge processing 500 returns to the decision block 504 and subsequent blocks. On the other hand, when the decision block 512 determines that charging has been requested, then charge battery processing 514 is performed at improved power levels. The charge battery processing of block 514 is described below in greater detail with respect to FIG. 9. Following block 514, the battery charge processing 500 returns to repeat the decision block 504 and subsequent blocks. As a result, the battery charge processing 500 is able to periodically update the power level with which it charges the battery for improved charging.

Figure 6:
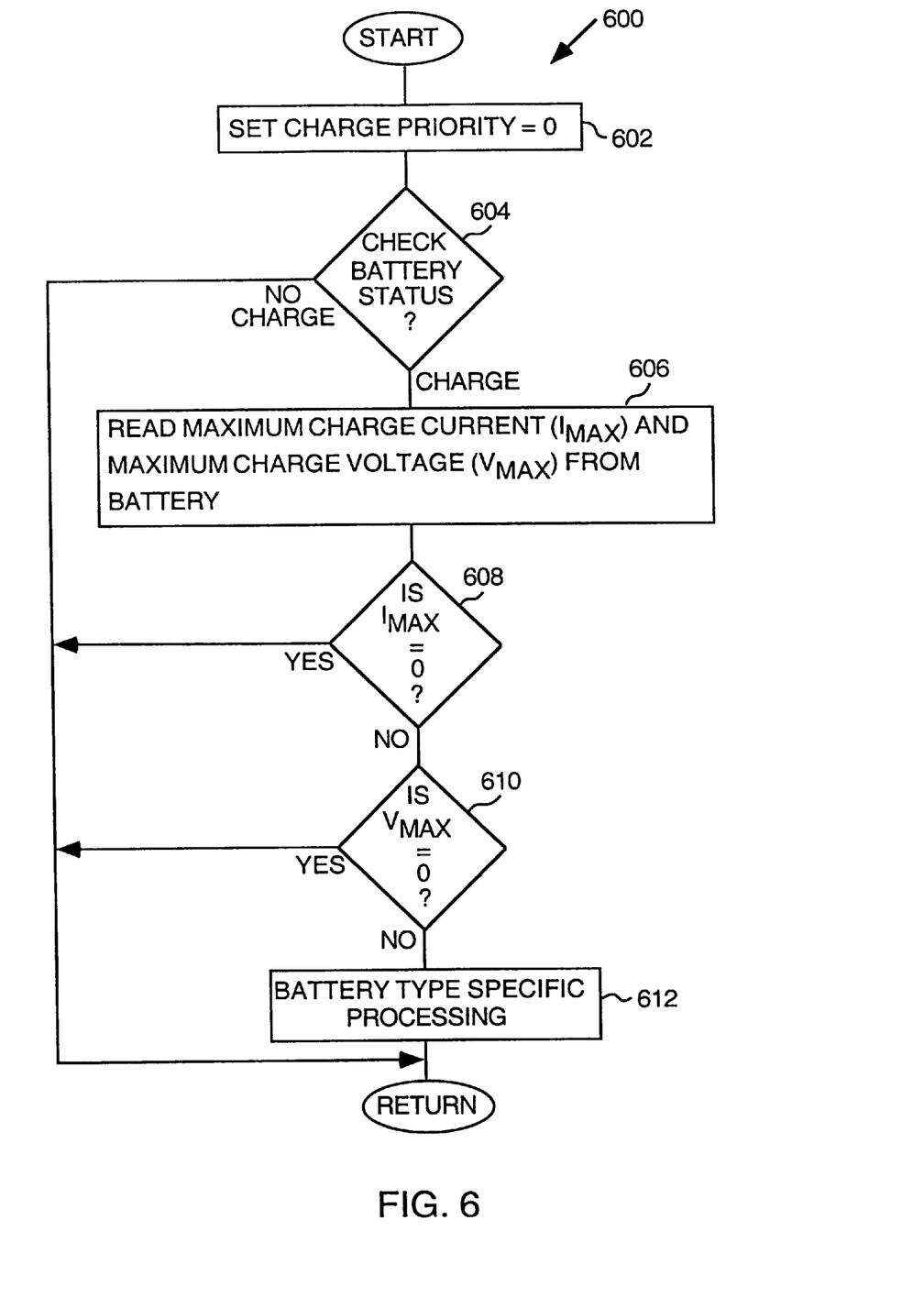
FIG. 6 is a flow diagram of charge request processing according to an embodiment of the invention.

FIG. 6 is a flow diagram of charge request processing 600 according to an embodiment of the invention. The charge request processing 600 represents one possible embodiment for the charge request processing performed in block 510 of the FIG. 5. The charge request processing 600 initially sets the charge priority to zero (0) in block 602. Next, a decision block 604 determines whether the battery status indicates charge or no charge. In other words, the decision block 604 determines whether the battery desires to be charged or not. When the decision block 604 determines that the battery does not desire to be charged, then the charge request processing 600 is complete and returns.

On the other hand, when the decision block 604 determines that the battery desires to be charge, then a maximum charge current ($I_{max}$) and maximum charge voltage ($V_{max}$) are read 606 from the battery. For example, with respect to FIG. 1, the battery monitor 112 can supply the maximum charge current and the maximum charge voltage for the battery 104 to the power management microprocessor 106. Next, a decision block 608 determines whether the maximum charge current ($I_{max}$) is equal to zero (0). If the maximum charge current is equal to zero (0), then the charge request processing 600 is complete and returns. On the other hand, if the maximum charge current is not equal to zero (0), then a decision block 610 determines whether the maximum charge voltage ($V_{max}$) is equal to zero (0).

When either the maximum charge current ($I_{max}$) or the maximum charge voltage ($V_{max}$) is equal to zero (0), then no charging will take place for the battery; hence, the charge request processing is complete and returns. On the other hand, when neither the maximum charge current ($I_{max}$) nor the maximum charge voltage ($V_{max}$) are equal to zero (0), then battery type specific processing 612 is performed. The battery type specific processing 612 is described in more detail below with respect to FIG. 7. Following block 612, the charge request processing 600 is complete and returns.

Figure 7:
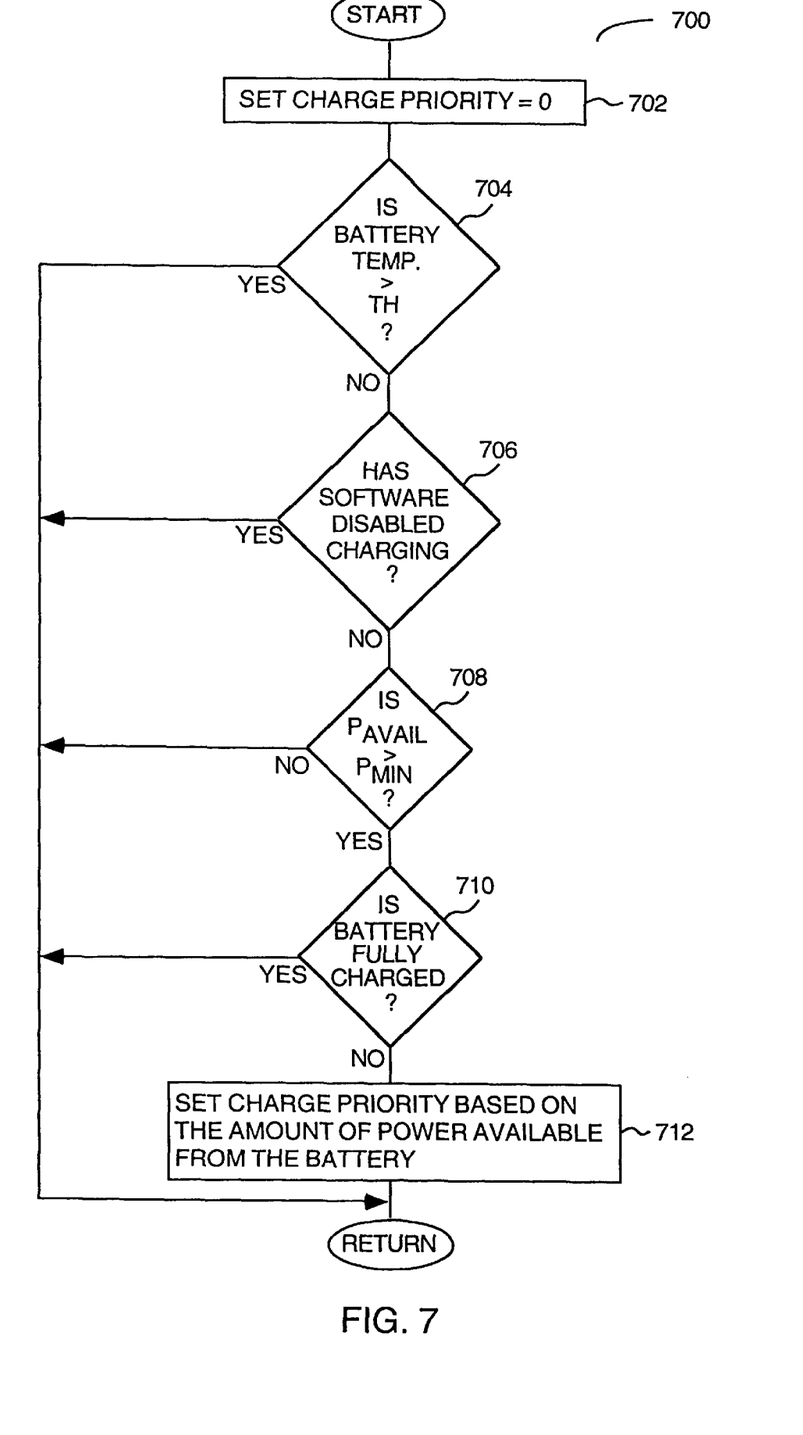
FIG. 7 is a flow diagram of battery type specific processing according to an embodiment of the invention.

FIG. 7 is a flow diagram of battery type specific processing 700 according to an embodiment of the invention. The battery type specific processing 700 is, for example, performed by the battery type specific processing shown in block 612 of FIG. 6.

The battery type specific processing 700 initially sets 702 the charge priority to zero (0). Next a decision block 704 determines whether the battery temperature exceeds a threshold temperature. When the decision block 704 determines that the battery temperature exceeds the threshold voltage associated with that particular type of battery, the battery type specific processing 700 is complete and returns. In this case, the battery temperature is deemed too high for the battery to be charged because the charging would further increase the temperature of the battery. On the other hand, when the decision block 704 determines that the battery temperature does not exceed the threshold temperature, then a decision block 706 determines whether software has disable the charging of the battery. When the decision block 706 determines that the software has disabled the charging of the battery, then the battery type specific processing 700 is also complete and returns. On the other hand, when the software has not disabled the charging, then a decision block 708 determines whether the power available ($P_{AVAIL}$) is greater than a minimum power availability ($P_{MIN}$) When the power available ($P_{AVAIL}$) is less than or equal to the minimum power level, then it is recognized by the battery type specific processing 700 that there is not a sufficient amount of power available to properly power the charging of the specific type of battery associated with the battery type specific processing 700. Hence, in this situation, the battery type specific processing 700 is complete and returns. On the other hand, when the decision block 708 determines that the power available ($P_{AVAIL}$) exceeds the minimum power availability ($P_{AVAIL}$) for charging, a decision block 710 determines if the battery is fully charged. If the decision block 710 determines that the battery is fully charged, then there is no need for battery charging; hence, the battery type specific processing 700 is complete and returns. On the other hand, when the battery is not fully charged, then a charge priority is set 712 based on the amount of power available from the battery. Here, the charge priority is set 712 to a non-zero value that represents the priority with which it should be charged. Following the block 712, the battery type specific processing 700 is complete and returns. Note that when any of the decision blocks 704, 706, 708 or 710 cause the battery type specific processing 700 to terminate early (I.e., bypassing block 712), the charge priority remains set at zero (0) which indicates that no charging is to occur. Further, while any non-zero value for the charge priority indicates charging is requested, when multiple batteries are associated with the portable computing device, the order in which the batteries are charged can be determined by the magnitude of the non-zero value for the charge priority.

Figure 8:
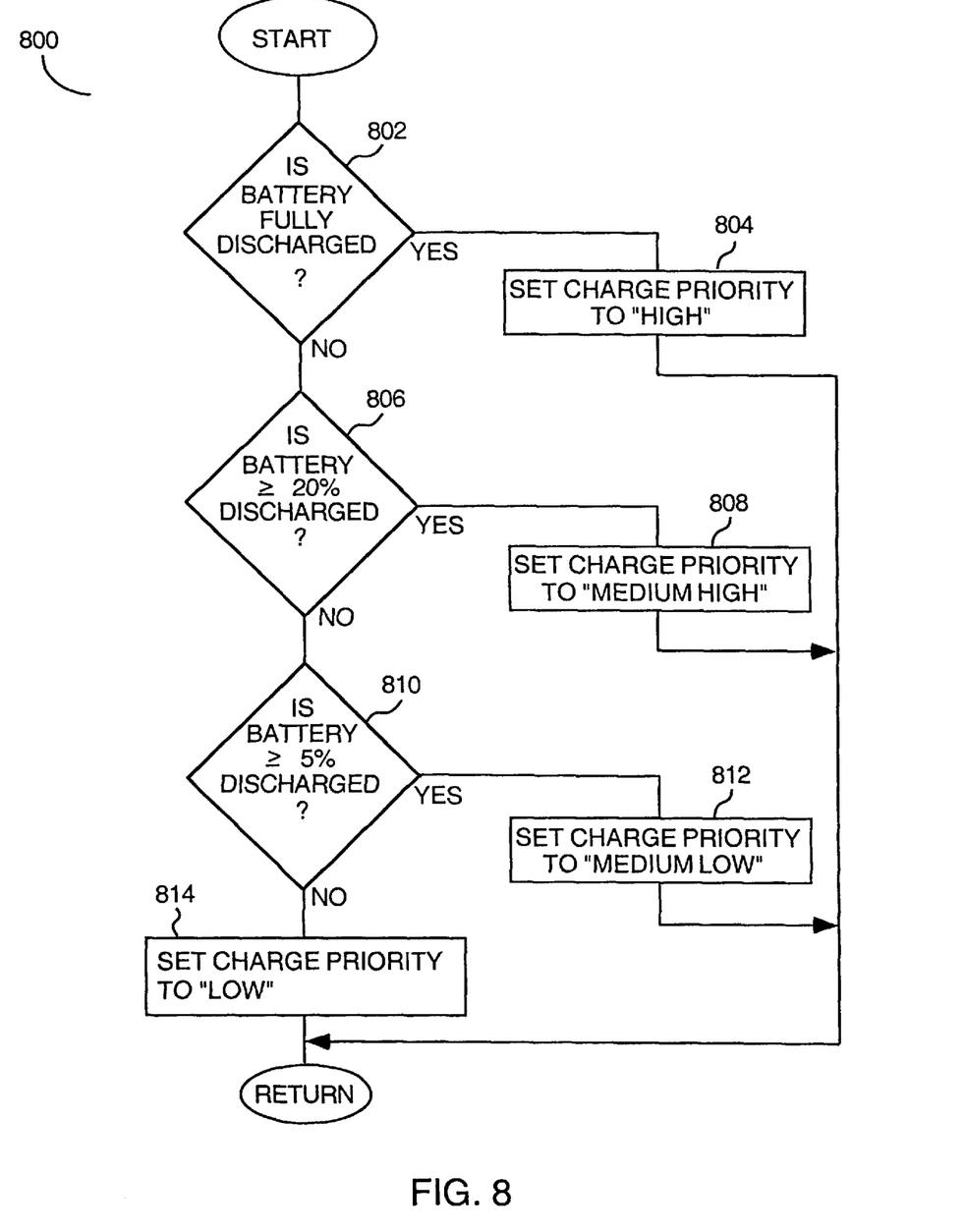
FIG. 8 is a flow diagram of set charge priority processing according to an embodiment of the invention.

FIG. 8 is a flow diagram of set charge priority processing 800 according to an embodiment of the invention. The set charge priority processing 800 is, for example, associated with the setting of the charge priority in block 712 of FIG. 7.

The set charge priority processing 800 begins with a decision block 802. The decision block 802 determines whether the battery is fully discharged. When the decision block 802 determines that the battery is fully discharged, then the charge priority is set 804 to "high" because the charging of the battery in this condition is very urgent. On the other hand, when the decision block 802 determines that the battery is not fully discharged, then a decision block 806 determines whether the battery is at least 20% discharged. When the decision block 806 determines that the battery is at least 20% discharged, then the charge priority is set to "medium high" because the charging of the battery is serious but not urgent. On the other hand, when the decision block 806 determines that the battery is not at least 20% discharged then a decision block 810 determines whether the battery is at least 5% discharged. When the decision block 810 determines that the battery is at least 5% discharged, then the charge priority is set 812 to "medium low". On the other hand, when the decision block 810 determines that the battery is not at least 5% discharged, then the charge priority is set to "low". Here, the charge priority is set to "low" because the battery is sufficiently charged at this point but could be further charged if power were available. Following block 814 as well as following blocks 804, 808 and 812, the set charge priority processing 800 is complete and returns.

Figure 9:
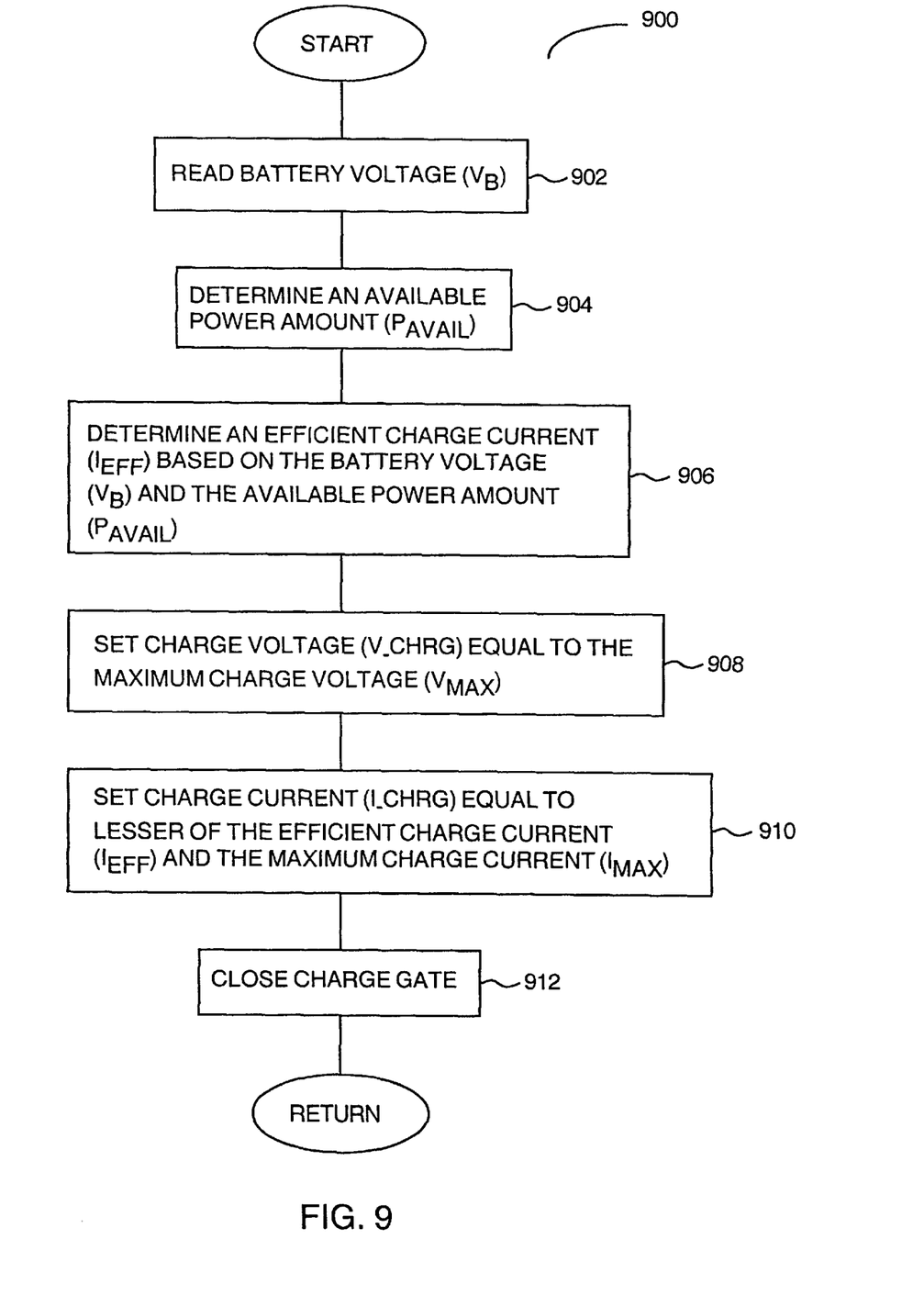
FIG. 9 is a flow diagram of charge battery processing according to an embodiment of the invention.

FIG. 9 is a flow diagram of charge battery processing 900 according to an embodiment of the invention. The charge battery processing 900 is, for example, associated with the charge battery processing indicated in block 514 of FIG. 5.

The battery charge processing 900 initially reads 902 the battery voltage ($V_B$) from the battery. For example, the battery may be a "smart battery" that provides status and condition information about the battery to requesting users. The battery voltage ($V_B$) is one piece of the status and condition information. Otherwise, the battery voltage ($V_B$) is obtained by other well known techniques.

Next, the charge battery processing 900 determines 904 an available power amount ($P_{AVAIL}$). The available power amount ($P_{AVAIL}$) can, for example, be determined by the power management microprocessor 106 or can be predetermined. The charge battery processing 900 then determines 906 an efficient charge current ($I_{EFF}$) based on the battery voltage ($V_B$) and the available power amount ($P_{AVAIL}$) Next, the charge voltage (V_CHRG) is set 908 equal to the maximum charge voltage ($V_{MAX}$). Recall, the maximum charge voltage ($V_{MAX}$) represents the maximum voltage that should be used to charge the battery. In addition, the charge current (I_CHRG) is set 910 equal to the lesser of the efficient charge current ($I_{EFF}$) and the maximum charge current ($I_{MAX}$).

Following block 910, the charge gate is closed 912 to effectuate the actual delivery of the charge current to the battery. For example, in FIG. 1, the charge gate 114 would be closed to supply charge from the battery charge circuit to the battery 104. Following the block 912, the charge battery processing 900 is complete and returns.

More particularly, the determining of the available power amount ($P_{AVAIL}$) and the efficient charge current ($I_{EFF}$) for use in charging the battery can be performed as follows. The available power amount ($P_{AVAIL}$) can be determined in accordance with the following equation (1):

$$P_{AVAIL} = P_{EXCESS} \times \text{(power supply efficiency-margin)} \quad (1)$$

where $P_{EXCESS}$ represents the excess power available from the power supply, and power supply efficiency is the efficiency of the power supply. The margin is used to provide a conservative estimate for the available power amount ($P_{AVAIL}$) For example, if the $P_{EXCESS}$=10 Watts, the power supply efficiency is 95%, and the margin is 5%, then the $P_{AVAIL}$=9 Watts.

The efficient charge current ($I_{EFF}$) can be determined in accordance with the following equation (2):

$$I_{EFF} = P_{AVAIL}/V_B \quad (2)$$

Hence, the efficient charge current ($I_{EFF}$) changes as the battery voltage ($V_B$) changes such that the available power amount ($P_{AVAIL}$) is continuously supplied to the battery for charging the battery. Also, as noted above, the efficient charge current ($I_{EFF}$) will also change if the excess power available ($P_{EXCESS}$) changes. For example, if the charging begins while the portable computing device is inactive or in a low power mode and then become active or in a normal operating mode, the portable computing device will itself consume more power. As a result, the excess power available ($P_{EXCESS}$) is reduced, which means that the available power amount ($P_{AVAIL}$) is also reduced, and thus the efficient charge current ($I_{EFF}$) is reduced.

In one embodiment, the computation of equation (1) to determine the efficient charge current ($I_{EFF}$) can be efficiently performed by a look-up operation into a look-up table (LUT). For example, a LUT can have a series of entries which associate an available power amount ($P_{AVAIL}$) and a battery voltage ($V_B$) to an efficient charge current ($I_{EFF}$). For example, a representative entry of a LUT would be as follows:

| $P_{AVAIL}$ | $V_B$ | $I_{EFF}$ |
|---|---|---|
| | | |

Each of the three files can, for example, contain 5 bits, 3 bits and 8 bits, respectively. Since there are only a limited number of states for the available power amount ($P_{AVAIL}$), the battery voltage ($V_B$) and the efficient charge current ($I_{EFF}$), the resulting power curve is a staircase-type line (curve) such as the line 406 illustrated in FIG. 4.

Figure 10:
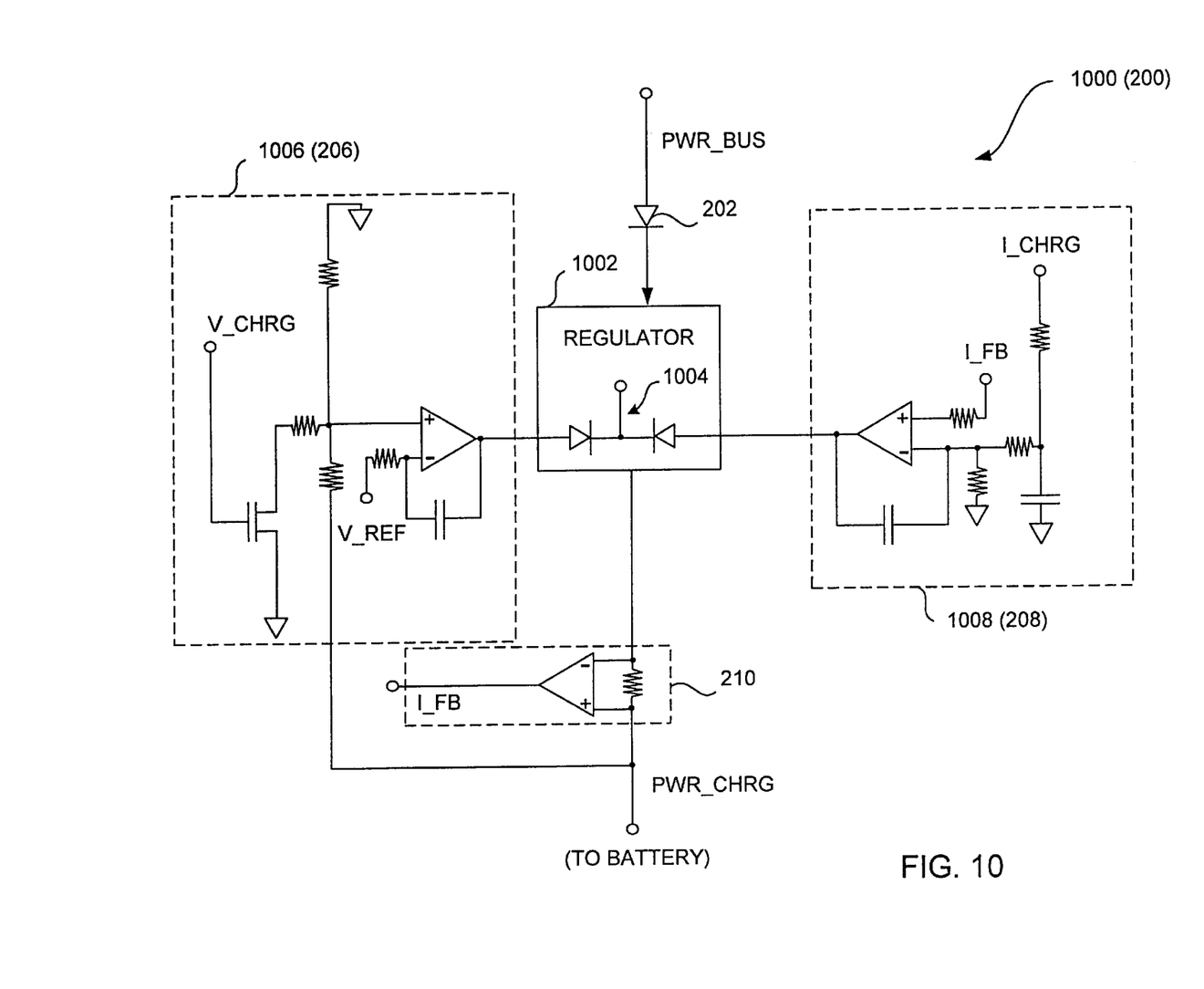
FIG. 10 illustrates a detailed diagram of a battery charge circuit that uses pulse-width modulation (PWM) signals for a charge voltage and a charge current.

Still further, in one embodiment, the charge voltage (V_CHRG) and the charge current (I_CHRG) supplied to the battery charge circuit 108 are pulse-width modulation (PWM) signals. Hence, the LUT could also store the efficient charge current ($I_{EFF}$) is a PWM fashion. Also facilitate comparison, the maximum charge current ($I_{MAX}$) could be represented in a PWM fashion. FIG. 10 illustrates a detailed diagram of a battery charge circuit 1000 that uses PWM signals for the charge voltage (V_CHRG) and the charge current (I_CHRG). The battery charge circuit 1000 is generally similar to the battery charge circuit 200 illustrated in FIG. 2. Specifically, the battery charge circuit 1000 includes a regulator 1002 that includes among other things a diode OR circuit 1004. The battery charge circuit 1000 also includes a voltage control circuit 1006 and a current control circuit 1008 that respectively supply inputs to the diode OR circuit 1004. The diode OR circuit 1004 causes the regulator 1002 to supply the approximately constant power to the battery during charging. Given the construction of the voltage control circuit 1006 and the current control circuit 1008, these type circuits are referred to as servo amplifier circuits.

The invention has numerous advantages. One advantage of the invention is that a battery are able to be charged significantly faster than previously. For example, tests have shown charging can be achieved 20–40 percent faster using the inventive techniques. Another advantage of the invention is that the charging of the battery is safely performed regardless of the amount of power being consumed by the operation of the portable computing device. Still another advantage of the invention is that battery type specific processing can be readily provided for different battery types such as Lithium Ion, Lead Acid, Nickel Zinc, Rechargeable Alkaline-maganese, etc. which are preferably charged differently.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for charging a battery within a portable computing device using a charge current, said method comprising:
   (a) coupling the portable computing device to a power source;
   (b) obtaining a maximum charge current and a maximum charge voltage from the battery;
   (c) determining an amount of power from the power source that is available for charging the battery;
   (d) determining an efficient charge current based on the battery voltage and the amount of power available; and
   (e) producing a charge current based on the lesser of the maximum charge current and the efficient charge current, the charge current being used to charge the battery.

2. A method as recited in claim 1, wherein said obtaining (b) of the maximum charge current and the maximum charge voltage are contained with a charge request,
   wherein said method supports the charging of a plurality of batteries, and
   wherein said method further comprises (f) determining a priority for the charge request so that multiple charge requests can be serviced by said method.

3. A method as recited in claim 2, wherein the priority for the charge request is determined based on the degree to which the battery is discharged.

4. A method as recited in claim 1, wherein said method further comprises:
   (f) charging the battery in accordance with the charge current.

5. A method as recited in claim 4, wherein said method further comprises:
   (g) determining the battery temperature of the battery; and
   (h) bypassing said charging operation (f) when the battery temperature is greater than a threshold temperature.

6. A method as recited in claim 4, wherein said method further comprises:
   (g) bypassing said charging operation (f) when the amount of power available is less than a predetermined minimum amount.

7. A method as recited in claim 4, wherein said method further comprises:
   (g) bypassing said charging operation (f) when the battery is fully charged.

8. A method as recited in claim 4, wherein the battery has a battery temperature, and
   wherein said method further comprises (g) bypassing said charging operation (f) when any one of: the battery temperature is greater than a threshold temperature, the amount of power available is less than a predetermined minimum amount, and the battery is fully charged.

9. A method as recited in claim 1, wherein said method further comprises:
   (g) repeating at least operations (c)–(f) so as to periodically change the charge current as the charging of the battery occurs to compensate for changes to the amount of power available power or changes to the battery voltage.

10. A method as recited in claim 9, wherein the battery has a battery temperature,
    wherein said method further comprises: (f) charging the battery in accordance with the charge current, and
    wherein said method further comprises (g) bypassing said charging operation (f) when any one of: the battery temperature is greater than a threshold temperature, the amount of power available is less than a predetermined minimum amount, and the battery is fully charged.

11. A method as recited in claim 9, wherein said obtaining (b) of the maximum charge current and the maximum charge voltage are contained with a charge request,
    wherein said method supports the charging of a plurality of batteries, and
    wherein said method further comprises determining a priority for the charge request so that multiple charge requests can be serviced by said method.

12. A method as recited in claim 11, wherein the priority for the charge request is determined based on the degree to which the battery is discharged.

13. A method for charging a battery of a portable computing device from a power supply, comprising:
    (a) determining an amount of power available for charging from the power supply;
    (b) determining power limits for charging the battery from the battery;
    (c) setting a power charge level for charging the battery based on the power limits and the available power; and
    (d) charging the battery in accordance with the power charge level.

14. A method as recited in claim 13, wherein said method further comprises:
    (e) repeating operations (a)–(d) to cause the power charge level to periodically adjust in accordance with the power limits and the available power.

15. A method as recited in claim 14, wherein the power charge level for the charging operation (d) is set by the setting operation (c) is the lower one of the power limits and the available power.

16. A method as recited in claim 14, wherein when the available power drops, said setting operation (c) causes the power charge level for the charging operation (d) to also drop such that an amount of power being drawn from the power supply never exceeds the available power.

17. A method as recited in claim 16, wherein the portable computing device is a portable personal computer.

18. A method as recited in claim 13, wherein said determining operation (b) comprises:
    receiving a charge request from the battery, the charge request identifying the power limits for charging the battery.

19. A method as recited in claim 13, wherein said method further comprises (e) determining a priority for the charge request so that multiple charge requests can be serviced by said method.

20. A method as recited in claim 13, wherein the power charge level for the charging operation (d) is set by the setting operation (c) is the lower one of the power limits and the available power.

21. A method as recited in claim 13, wherein when the available power drops, said setting operation (c) causes the power charge level for the charging operation (d) to also drop such that an amount of power being drawn from the power supply never exceeds the available power.

22. A computer system, comprising:
   a power supply for providing DC power to said computer system from an AC power source;
   a battery for providing DC power to said computer system;
   a processing and storage apparatus for performing computations as well as storage and retrieval of data;
   a power management unit for monitoring status of said battery and determining a power charge level for charging said battery based on an amount of available power from said power supply after supplying power to said processing apparatus; and
   a battery charge circuit for delivering power from said power supply to said battery in accordance with the power charge level.

23. A computer system as recited in claim 22, wherein the power charge level is periodically re-determined by said power management unit so that the power charge level varies as the amount of available power varies.

24. A computer system as recited in claim 22, wherein the monitoring of the status of said battery includes monitoring a battery voltage of said battery, and
   wherein said battery charge circuit supplies a charge current to said battery to charge said battery, and as the battery voltage varies the charge current varies so as to maintain the power charge level.

25. A computer system as recited in claim 22, wherein the monitoring of the status of said battery includes monitoring a power limits for charging said battery, and
   wherein the power charge level for the charging is determined by the lower one of the power limits and the available power.

26. A computer system as recited in claim 22, wherein when the available power drops, the power charge level for the charging determined by said power management unit also drops such that an amount of power being drawn from said power supply never exceeds the available power, yet the power charge level is maintained high so that said battery is charge rapidly and safely.

27. A computer system as recited in claim 22, wherein said computer system is a portable computer system.

28. A computer system as recited in claim 22, wherein said computer system is a hand-held portable computer system.

\* \* \* \* \*